(12) United States Patent
Schwarz et al.

(10) Patent No.: US 12,216,832 B2
(45) Date of Patent: *Feb. 4, 2025

(54) GESTURE RECOGNITION BASED ON LIKELIHOOD OF INTERACTION

(71) Applicant: Microsoft Technology Licensing, LLC, Redmond, WA (US)

(72) Inventors: Julia Schwarz, Bellevue, WA (US); Bugra Tekin, Zurich (CH); Sophie Stellmach, Kirkland, WA (US); Erian Vazquez, Redmond, WA (US); Casey Leon Meekhof, Redmond, WA (US); Fabian Gobel, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,906

(22) Filed: Sep. 8, 2023

(65) Prior Publication Data

US 2023/0418390 A1    Dec. 28, 2023

Related U.S. Application Data

(63) Continuation of application No. 17/649,659, filed on Feb. 1, 2022, now Pat. No. 11,768,544.

(51) Int. Cl.
| | |
|---|---|
| *G06F 3/01* | (2006.01) |
| *G06N 3/08* | (2023.01) |
| *G06V 10/82* | (2022.01) |
| *G06V 40/20* | (2022.01) |

(52) U.S. Cl.
CPC .............. *G06F 3/017* (2013.01); *G06F 3/013* (2013.01); *G06N 3/08* (2013.01); *G06V 10/82* (2022.01); *G06V 40/28* (2022.01)

(58) Field of Classification Search
CPC .......... G06F 3/017; G06F 3/013; G06F 3/011; G06N 3/08; G06V 10/82; G06V 40/28
See application file for complete search history.

(56) References Cited

U.S. PATENT DOCUMENTS

| | | | |
|---|---|---|---|
| 11,768,544 B2 * | 9/2023 | Schwarz ................. | G06F 3/013 345/156 |
| 2020/0249752 A1 * | 8/2020 | Parshionikar ........... | G06F 3/016 |

* cited by examiner

*Primary Examiner* — Grant Sitta
(74) *Attorney, Agent, or Firm* — Alleman Hall & Tuttle LLP

(57) ABSTRACT

A method for evaluating gesture input comprises receiving input data for sequential data frames, including hand tracking data for hands of a user. A first neural network is trained to recognize features indicative of subsequent gesture interactions and configured to evaluate input data for a sequence of data frames and to output an indication of a likelihood of the user performing gesture interactions during a predetermined window of data frames. A second neural network is trained to recognize features indicative of whether the user is currently performing one or more gesture interactions and configured to adjust parameters for gesture interaction recognition during the predetermined window based on the indicated likelihood. The second neural network evaluates the predetermined window for performed gesture interactions based on the adjusted parameters, and outputs a signal as to whether the user is performing one or more gesture interactions during the predetermined window.

20 Claims, 10 Drawing Sheets

GESTURE RECOGNITION BASED ON LIKELIHOOD OF INTERACTION

CROSS REFERENCE TO RELATED APPLICATIONS

This application is a continuation of U.S. patent application Ser. No. 17/649,659, filed Feb. 1, 2022, the entirety of which is hereby incorporated herein by reference for all purposes.

BACKGROUND

Computing and gaming devices that include camera inputs may allow for users to interact with software user interfaces through the use of natural language input, such as gesture-based controls. Users may utilize gestures, rather than specific input devices to provide commands. In some examples, the gestures may be in the form of direct interactions with display content, such as two-dimensional images, holograms, etc. In some examples, the gestures may be tied to specific commands for the user interface that may be recognized irrespective of the positioning of any display imagery.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for evaluating gesture input comprises receiving input data for sequential data frames, including hand tracking data for one or more hands of a user. A first neural network is trained to recognize features indicative of subsequent gesture interactions and configured to evaluate input data for a sequence of data frames and to output an indication of a likelihood of the user performing gesture interactions during a predetermined window of data frames. A second neural network is trained to recognize features indicative of whether the user is currently performing one or more gesture interactions and configured to adjust parameters for gesture interaction recognition during the predetermined window based on the indicated likelihood. The second neural network evaluates the predetermined window for performed gesture interactions based on the adjusted parameters, and outputs a signal as to whether the user is performing one or more gesture interactions during the predetermined window.

DETAILED DESCRIPTION

Gesture interactions for computing and gaming devices provide users a low effort, easy to learn means of providing input commands. Gesture interactions may be used to interact with display images, manipulate holograms, etc., depending on the characteristics of the associated camera inputs and the user interface (UI). Natural hand movement-based interactions allow for natural interactions using hands and fingers, which are always accompanying the user, rather than requiring the user to utilize specific controllers and input devices.

Augmented reality (AR) devices allow for a user to view holographic imagery alongside real-world content. This can make gesture interactions difficult to discern from real-world actions, as the user could either be interacting with real-world objects or with holographic content within the AR UI. Similar hand movements may be used to perform real-world and AR tasks, and thus the gesture recognition machinery may be challenged to determine whether a user is positioning their hands to interact with virtual content, or simply doing everyday activities such as interacting with their phone, writing on a piece of paper, cooking, or eating food.

Figure 1:
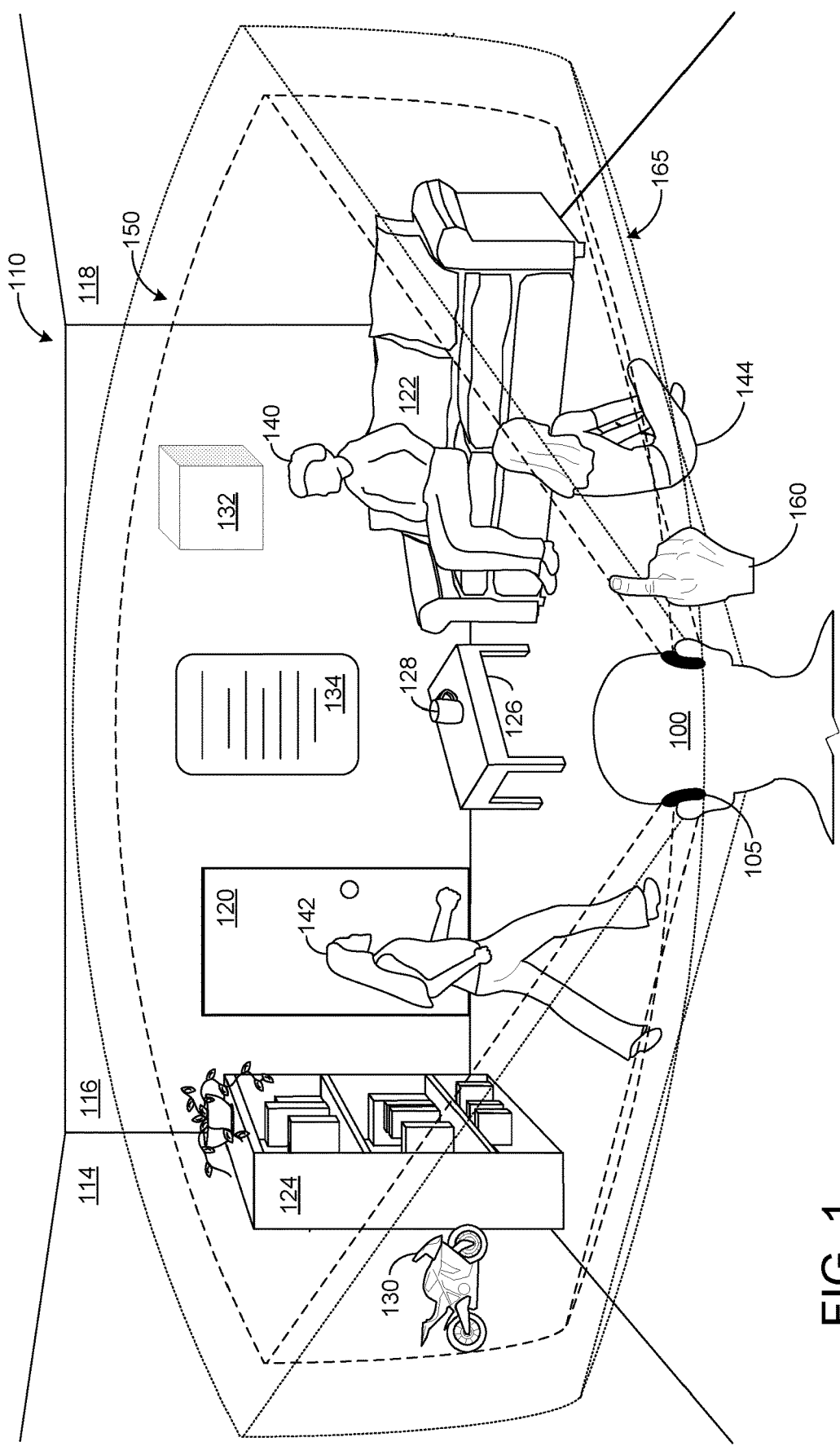
FIG. 1 shows a user wearing a head-mounted display in an example augmented reality use environment.

FIG. 1 is a schematic illustration of a user 100 wearing head-mounted display device 105 and standing in the real-world physical environment of room 110. The room 110 includes a number of physical objects and surfaces, such as walls 114, 116 and 118, door 120, couch 122, bookcase 124, coffee table 126, and coffee cup 128, all of which are visible to the user via a see-through display of head-mounted display device 105.

Head-mounted display device 105 may display to user 100 virtual content that appears to be located at different three-dimensional locations within room 110. In the example of FIG. 1, head-mounted display device 105 displays virtual content in the form of a holographic motorcycle 130, holographic cube 132, and holographic display monitor 134. Additional individuals 140, 142, and 144 within room 110 are not equipped with their own head-mounted display devices, and thus are unable to view the virtual content.

Head-mounted display device 105 may have a field-of-view, indicated by dashed lines 150, that defines a volume of space in which the user may view virtual content displayed by the device. In different examples of head-mounted display device 105, the field-of-view (FOV) may have different shapes, such as cone-shaped, frustum-shaped, pyramid-shaped, or any other suitable shape. In different examples of head-mounted display device 105, the field-of-view also may have different sizes that occupy different volumes of space.

Sensors included in head-mounted display device 105 may enable natural user interface (NUI) controls, such as gesture inputs based on gestures performed by user's hand 160 when user's hand 160 is within the field-of-view 165

(dotted lines) of the outward facing imaging sensors of head-mounted display device 105.

In this way, user 100 may interact with virtual content without being required to hold a controller or other input device, thus freeing user 100 to interact with real-world and/or virtual world objects with either hand. As shown, the field-of-view of the outward facing imaging sensors (165) may have a larger footprint than the field-of-view of the head-mounted display device (150), and thus some objects may be imaged even if they are not viewable by user 100. This may enable user 100 to perform gestures out of their own field-of-view and still have the performed gestures be used as NUI controls.

In scenarios where use of the augmented reality device is constrained to a specific venue (e.g., home, manufacturing assistance) performing obvious gesture commands may not present a problem. But in order for AR devices to become widely used in more public locations (e.g., public transit, meetings, sporting events), users may prefer the devices be operable in a socially acceptable manner. As such, more subtle gestures are desired for NUI controls. As shown in FIG. 1, user 100 may appear, to individuals 140, 142, and 144, to be randomly waving their hands around and poking at the invisibility in front of them.

However, relaxing gesture recognition constraints on the air tap gesture may lead to accidental input when the user is performing everyday activities such as typing or gesticulating. As an example, a common gesture such as the "air tap" gesture may require the user to hold their hand upright with the pointer finger pointed up and then pinch their index finger and thumb together. If user 100 manually interacts with objects such as coffee cup 128, door 120, books on bookshelf 124, or merely gesticulates in conversation with individuals 140, 142, and 144, the gesture recognition software may mistake these real-world hand movements for such a gesture input, potentially altering the display content presented on head-mounted display device 105.

As such, there is a tradeoff between using relaxed gesture recognition constraints which allow users to perform more subtle gestures but may result in false positives, and more strict gesture recognition constraints which reduce false positives but may dissuade users from interacting in public settings.

In general, the gesture recognition criteria may include hard-coded requirements that are used to train a machine-learning algorithm, such as a deep neural network. However, the training of the machine-learning algorithm generally includes input data of the user performing the gesture in the absence of other real-world objects. Further, most approaches to gesture recognition analyze only the current frame of input data to determine what's happening in the frame. As such, important context about what the user hand is currently doing, and what the user's hand might do in the immediate and near future are not considered at the level of gesture recognition, potentially leading to recurring false positives.

To combat these challenges, the systems and methods described herein utilize a first neural network that indicates whether a user is likely to perform a subsequent gesture interaction based on a sequence of data frames that may include hand, body, head, and eye data inputs. In this way, the first neural network may assess whether the user is more likely to be interacting with the NUI interface or with real-world objects. A second neural network then performs gesture interaction recognition during a predetermined window using parameters that are adjusted based on the indicated likelihood. Although primarily described herein as a system comprising two separately trained neural networks, the examples herein could additionally or alternatively be implemented as a single neural network or other trained model that utilizes analysis of a received sequence of data frames to generate a likelihood of gesture interaction that can then be used as an input to gesture interaction recognition machinery to allow the system to more accurately recognize a broader range of gestures with more relaxed constraints.

Accurate prediction of user intent allows for the relaxing of gesture requirements if the user has a high likelihood of performing a gesture interaction with the AR UI, and for applying more stringent gesture requirements if the user has a low likelihood of interaction. This approach may yield more accurate gesture recognition and reduce false positives. or disabling gesture input altogether Additionally, the output of the first neural network may be used to disable gesture input altogether if it is indicated that the user is not intending to engage with the UI or certain portions of the UI. A user performing a real-world task with their hands (e.g., eating, washing hands, typing) can be inferred, and the UI disabled to prevent false positive inputs. This approach may also enable anticipation, such as predicting what the user might do several frames in advance and setting gesture interaction recognition parameters accordingly.

Figure 2:
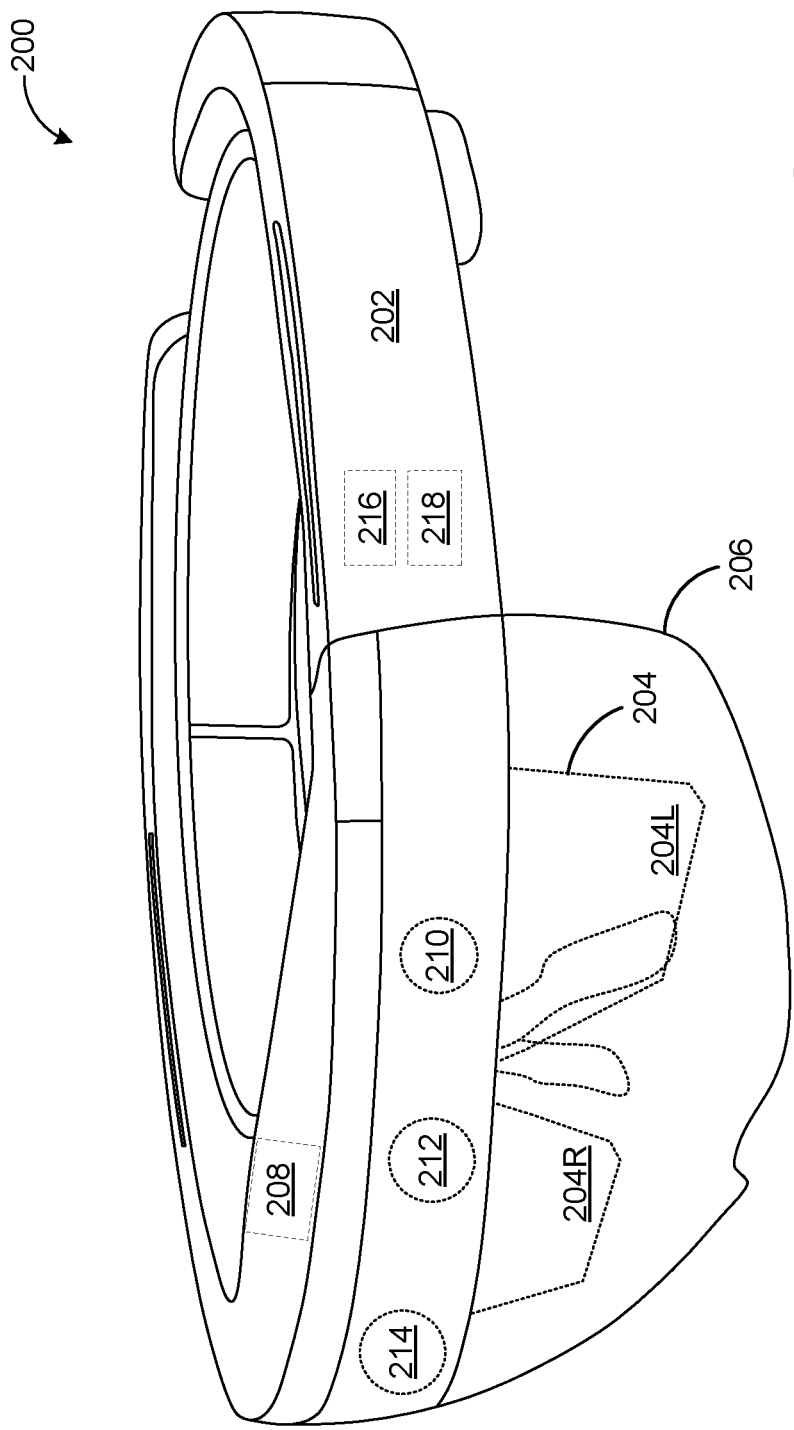
FIG. 2 shows a schematic view of a head-mounted display device according to an example of the present disclosure.

FIG. 2 schematically illustrates an example head-mounted display device (HMD) 200. Such a head-mounted display, and other augmented reality devices may take a variety of forms, such as standard and/or slightly oversized eyeglasses, helmets with visors, monocles, etc. As such the form factor of HMD 200 is merely exemplary. The head-mounted display device 200 includes a frame 202 in the form of a band wearable around a head of the user that supports see-through display componentry positioned near the user's eyes. Head-mounted display device 200 may use augmented reality technologies to enable simultaneous viewing of virtual display imagery and a real-world background. As such, the head-mounted display device 200 may generate virtual images via see-through display 204, which includes separate right and left eye displays 204R and 204L, and which may be wholly or partially transparent. The see-through display 204 may take any suitable form, such as a waveguide or prism configured to receive a generated image and direct the image towards a wearer's eye. The see-through display 204 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 204 may utilize quantum-dot display technologies, active-matrix organic LED (OLED) technology, and/or any other suitable display technologies. It will be understood that while shown in FIG. 2 as a flat display surface with left and right eye displays, the see-through display 204 may be a single display, may be curved, or may take any other suitable form.

The head-mounted display device 200 further includes an additional see-through optical component 206, shown in FIG. 2 in the form of a see-through veil positioned between the see-through display 204 and the real-world environment as viewed by a wearer. A controller 208 is operatively coupled to the see-through optical component 206 and to other display componentry. The controller 208 includes one or more logic devices and one or more computer memory devices storing instructions executable by the logic device(s) to enact functionalities of the head-mounted display device 200. The head-mounted display device 200 may further include various other components, for example an outward facing two-dimensional image camera 210 (e.g. a visible light camera and/or infrared camera), an outward facing depth imaging device 212, and an inward-facing gaze-tracking camera 214 (e.g. a visible light camera and/or infrared camera), as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Depth imaging device 212 may include an infrared light-based depth camera (also referred to as an infrared light camera) configured to acquire video of a scene including one or more human subjects. The video may include a time-resolved sequence of images of spatial resolution and frame rate suitable for the purposes set forth herein. The depth imaging device and/or a cooperating computing system (e.g., controller 208) may be configured to process the acquired video to identify one or more objects within the operating environment, one or more postures and/or gestures of the user wearing head-mounted display device 200, one or more postures and/or gestures of other users within the operating environment, etc.

The nature and number of cameras may differ in various depth imaging devices consistent with the scope of this disclosure. In general, one or more cameras may be configured to provide video from which a time-resolved sequence of three-dimensional depth maps is obtained via downstream processing. As used herein, the term "depth map" refers to an array of pixels registered to corresponding regions of an imaged scene, with a depth value of each pixel indicating the distance between the camera and the surface imaged by that pixel.

In some implementations, depth imaging device 212 may include right and left stereoscopic cameras. Time-resolved images from both cameras may be registered to each other and combined to yield depth-resolved video.

In some implementations, a "structured light" depth camera may be configured to project a structured infrared illumination having numerous, discrete features (e.g., lines or dots). A camera may be configured to image the structured illumination reflected from the scene. Based on the spacings between adjacent features in the various regions of the imaged scene, a depth map of the scene may be constructed.

In some implementations, a "time-of-flight" (TOF) depth camera may include a light source configured to project a modulated infrared illumination onto a scene. The camera may include an electronic shutter synchronized to the modulated illumination, thereby allowing a pixel-resolved phase-delay between illumination times and capture times to be observed. A time-of-flight of the modulated illumination may be calculated. The described cameras are provided as examples, and any sensor capable of detecting hand gestures may be used.

Head-mounted display device 200 further includes a gesture-recognition machine 216, and an eye-tracking machine 218. Gesture-recognition machine 216 is configured to process at least the depth video (i.e., a time-resolved sequence of depth maps and/or raw sensor data) from depth imaging device 212 and/or image data from outward facing two-dimensional image camera 210, to identify one or more human subjects in the depth video, to compute various geometric (e.g., skeletal) features of the subjects identified, and to gather from the geometric features various postural or gestural information to be used as NUI.

Gesture-recognition machine 216 may comprise one or more neural-networks with which to process input data from sensors of HMD 200 and elsewhere to identify gestures performed by the user. Gesture-recognition machine 216 may be trained using example data produced by the sensors of HMD 200, or synthesized sensor data mimicking actual sensor data, along with supervised labels indicating ground truths, such as whether a hand movement is or is not a gesture, and if it is a gesture, what type of gesture. The neural networks employed by gesture recognition machine 216 may evaluate input data based on a series of parameters (e.g., weights, coefficients, gradients) that may be adjusted based on sensor data, operating conditions, etc. to allow the neural networks to make more accurate identifications of gestures.

In one non-limiting embodiment, gesture-recognition machine 216 identifies at least a portion of one or more human subjects in the depth video. Through appropriate depth-image processing, a given locus of a depth map may be recognized as belonging to a human subject. In a more particular embodiment, pixels that belong to a human subject may be identified (e.g., by sectioning off a portion of a depth map that exhibits above-threshold motion over a suitable time scale) and a generalized geometric model of a human being may be derived from those pixels.

In one embodiment, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Further indices may be used to label pixels corresponding to different body parts. For example, pixels imaging a left hand may be labeled with a different index than pixels imaging a right hand; or pixels imaging a pointer finger may be labeled with a different index that pixels imaging a thumb.

Gesture-recognition machine 216 also may label pixels in any suitable manner. As one example, an artificial neural network may be trained to classify each pixel with appropriate indices/labels. In this way, different features of a hand or other body part may be computationally identified. Real-world objects that are associated with a hand or other body part may be identified generically, or may be assigned an identity using gesture-recognition machine 216 and/or other depth image analysis machinery. As described further herein and with regard to FIG. 5, if a user interaction with a real-world object is detected, the likelihood of the user interacting with a holographic object or performing an open-handed gesture may be decreased accordingly.

Gesture recognition machine 216 may track different body parts from frame to frame, thereby allowing different gestures to be discerned. For example, the three-dimensional position of fingers may be tracked from frame to frame, thus allowing parameters such as finger position, finger angle, finger velocity, finger acceleration, finger-to-finger proximity, etc. to be discerned.

The position of the user's eye(s) may be determined by eye-tracking machine 218 and/or gesture recognition machine 216. Eye-tracking machine 218 may receive image data from inward-facing gaze-tracking camera 214, and may evaluate that data using one or more neural networks or other machine-learning devices. In some examples, inward-facing gaze-tracking camera 214 includes two or more cameras, including at least one camera trained on the right eye of the user and at least one camera trained on the left eye of the user. As an example, eye-tracking machine 218 may determine the position of the user's eye based on the center point of the user's eye, the center point of the user's pupil, and/or gesture recognition machine 216 may estimate the location of the eye based on the location of the head-joint of the virtual skeleton.

Figure 3:
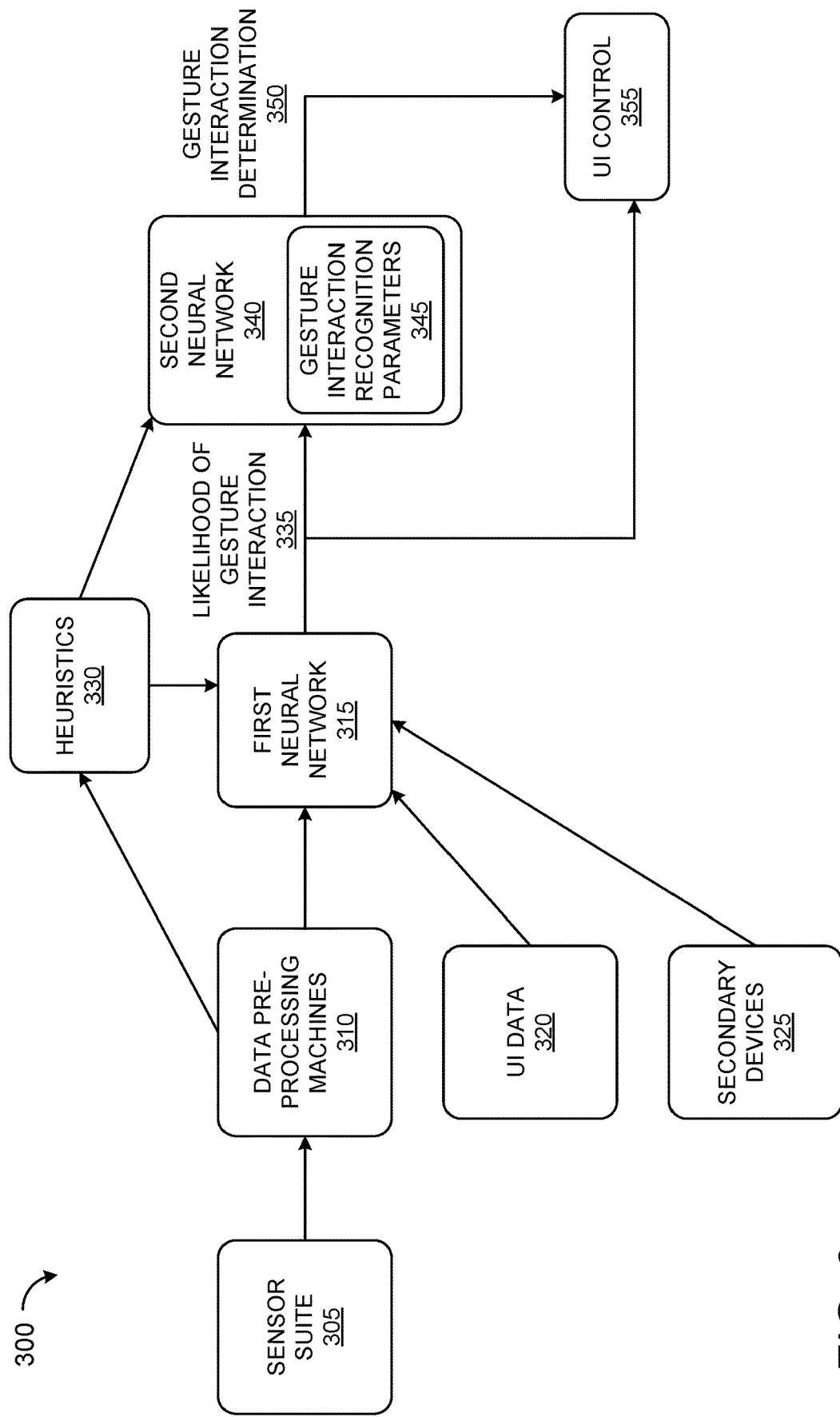
FIG. 3 schematically shows a system for evaluating gesture input based on a likelihood of user interaction.

FIG. 3 schematically shows a system 300 for evaluating gesture input based at least on a likelihood of a user performing a gesture interaction. System 300 may be a head-mounted display, such as HMD 105 and/or 200. System 300 may include a sensor suite 305, including such sensors as outward facing cameras (e.g., 2D, 3D/depth, infrared), inward facing cameras (e.g., for eye-tracking), accelerometers, gyroscopes, electroencephalogram (EEG) and/or electromyography (EMG) sensors, proximity sensors, etc. including, but not limited to, the sensors described with regard to HMD 200. Data acquired by sensor suite 305 may be provide to data pre-processing machines 310, which may include hand tracking machines, surface mesh extractors, eye-tracking machines, head and/or body pose determining machines, brain wave processing machines, neural networks having fixed and/or adjustable parameters, etc. Data pre-processing machines 310 may be configured to receive data output from sensor suite 305 and to sequentially output data frames. Pre-processed data may then be provided to a neural network, such as the neural networks included in gesture recognition machine 216, and/or to first neural network 315, which may be network trained to recognize features indicative of a plurality of subsequent gesture interactions. First neural network 315 may also receive data from sensor suite 305 that bypasses data pre-processing machines 310 (e.g., raw sensor data) in addition to or as an alternative to pre-processed data.

First neural network 315 may evaluate input data, such as pre-processed sensor data from data pre-processing machines 310, raw sensor data from sensor suite 305, UI data 320, data from secondary device inputs 325, and heuristically evaluated data 330. First neural network 315 may evaluate input data for a sequence of data frames (e.g., a single data frame or a plurality of data frames), and output an indication of a likelihood of gesture interaction 335, such as an indication of a likelihood of the user performing one or more subsequent gesture interactions with a user interface during a predetermined window of one or more data frames. In some examples, a single data frame may provide a clear indication that the user is not intending to make a gesture interaction with their hands in a subsequent data frame (e.g., holding a baby, taking a casserole out of the oven), while in other scenarios cooperatively considering a plurality of sequential frames may allow first neural network 315 to more accurately assess the context of a user's hand movements. In other words, first neural network 315 may infer whether a use is likely to interact with the UI via gesture input, unlikely, not at all likely, already interacting, etc. For example, a likelihood may be output as a real number between 0 and 1, where 0 represents that the user is not at all likely to perform a gesture in the predetermined window, while 1 represents already interacting with the UI or has already initiated performing a gesture.

Likelihood of gesture interaction 335 may then be fed as an input to second neural network 340, which may be trained to recognize features indicative of whether the user is currently performing one or more of the plurality of subsequent gesture interactions. In some examples, second neural network 340 may be one of a plurality of neural networks, each trained to recognize a different gesture interaction or set of gesture interaction. Each of these neural networks may be provided with the likelihood of gesture interaction 335. The gesture recognition parameters 345 of second neural network 340 are then adjusted based on likelihood of gesture interaction 335. The nodes of second neural network may be associated with adjustable parameters that when changed, alter the likelihoods of certain outputs of second neural network 340. Gesture recognition parameters 345 may include node coefficients, connection weights, gradients, etc. As such, different output data may be produced based on the values of the adjustable parameters even though the same input data is being evaluated by second neural network 340.

Although described primarily as comprising two separately trained neural networks, system 300 may additionally or alternatively comprise a single neural network and/or other trained gesture recognition machinery. Likelihood of gesture interaction 335 may thus be maintained in memory for a number of input frames and be provided as an input to the same neural network, be it to the input layer, one or more downstream and/or hidden layers, branches, etc. In this way, a single gesture recognition training platform may be used to determine both whether the user is currently performing a gesture, and to quantify the likelihood of performing a gesture in a forthcoming frame and/or sequence of frames of input data.

Likelihood of gesture interaction predictions may thus be used to reduce unintentional interactions, such as clicking, grabbing, dragging, etc. The technical effect of implementing this system is improved human-computer interaction and decreasing energy consumption from erroneous computations performed in response to unintentional interactions. Second neural network 340 may apply adjusted gesture interaction recognition parameters 345 to make a gesture interaction determination 350, including whether a user has made a gesture input and of what variety. The gesture interaction determination 350 may be passed to UI control 355 for downstream processing.

First neural network 315 and/or second neural network 340 may be a component of a gesture recognition machine, such as gesture recognition machine 216, which may be configured to analyze the pixels of a depth map that correspond to the user, in order to determine what part of the user's body each pixel corresponds to. A variety of different body-part assignment techniques can be used to this end. In one example, each pixel of the depth map with an appropriate person index may be assigned a body-part index. The body-part index may include a discrete identifier, confidence value, and/or body-part probability distribution indicating the body part or parts to which that pixel is likely to correspond.

In some embodiments, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses, including gesture hand poses. Trainers provide ground truth annotations labeling various machine-learning classifiers in the observed data. The observed data and annotations are then used to generate one or more machine-learned algorithms that map inputs (e.g., depth video) to desired outputs (e.g., body-part indices for relevant pixels).

Figure 4B:
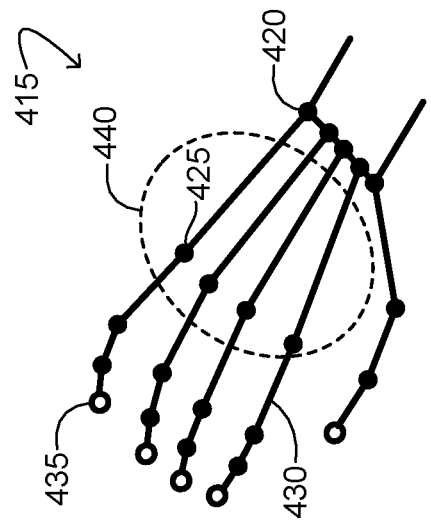
FIG. 4B shows aspects of a hand portion of an example virtual skeleton.
Figure 4A:
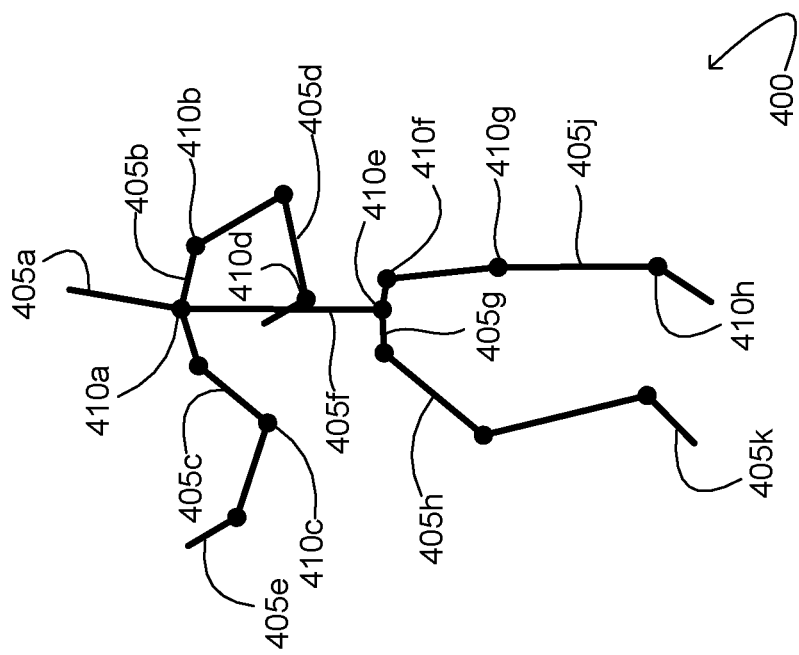
FIG. 4A shows aspects of an example virtual skeleton.

In some implementations, a virtual skeleton or other data structure for tracking feature positions (e.g., joints) may be fit to the pixels of depth and/or color video that correspond to the user. FIG. 4A shows an example virtual skeleton 400. The virtual skeleton includes a plurality of skeletal segments 405 pivotally coupled at a plurality of joints 410. In some embodiments, a body-part designation may be assigned to each skeletal segment and/or each joint. In FIG. 4A, the body-part designation of each skeletal segment 405 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 410 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 4A is in no way limiting. A virtual skeleton consistent with this disclosure may include virtually any type and number of skeletal segments, joints, and/or other features.

In a more particular embodiment, point clouds (portions of a depth map) corresponding to the user's hands may be further processed to reveal the skeletal substructure of the hands. FIG. 4B shows an example hand portion 415 of a user's virtual skeleton 400. The hand portion includes wrist joints 420, finger joints 425, adjoining finger segments 430, and adjoining finger tips 435. Joints and segments may be grouped together to form a portion of the user's hand, such as palm portion 440. Each hand of the user may be evaluated independently. In other examples, the raw point clouds of the depth map corresponding to the user's hands may be provided to first neural network 315 and/or second neural network 340 as part of input data frames.

Via any suitable minimization approach, the lengths of the skeletal segments and the positions and rotational angles of the joints may be adjusted for agreement with the various contours of a depth map. In this way, each joint is assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. This process may define the location and posture of the imaged human subject. Some skeletal-fitting algorithms may use the depth data in combination with other information, such as color-image data and/or kinetic data indicating how one locus of pixels moves with respect to another. In the manner described above, a virtual skeleton may be fit to each of a sequence of frames of depth video. By analyzing positional change in the various skeletal joints and/or segments, the corresponding movements—e.g., gestures or actions of the imaged user—may be determined.

The foregoing description should not be construed to limit the range of approaches usable to construct a virtual skeleton 400 or otherwise identify various hand features, for hand features may be derived from a depth map and/or other sensor data in any suitable manner without departing from the scope of this disclosure.

Regardless of the method used to extract features, once identified, each feature may be tracked across frames of the depth and/or image data on a per-frame basis (e.g., 60 fps). The plurality of different hand features may include a plurality of finger features, a plurality of fingertip features, a plurality of thumbtip features, a plurality of knuckle features, a plurality of wrist features, a plurality of palm features, a plurality of dorsum features, etc. The features may be defined at a position in space and represented by a series of spatial models and vectors. As an example, 26 hand features may be tracked in three-dimensions, although more or fewer features may be tracked.

In some examples, receiving hand tracking data for a first hand of the user includes receiving depth data for an environment, fitting a virtual skeleton to point clouds of the received depth data, assigning hand joints to the virtual skeleton, and tracking positions of the assigned hand joints across sequential depth images. In such an example, the assigned hand joints are provided to first neural network 315 and second neural network 340. In other examples, the raw depth data for the environment may be provided to the neural networks.

Returning to FIG. 3, inward facing cameras of sensor suite 305 may record the movement and positioning of a user's eyes, as described with regard to FIG. 2, and may provide this data to an eye tracking machine included in data pre-processing machines 310. Eye gaze direction data may include 3D vectors that indicate where the user is looking within their environment. Such vectors may be used to infer whether the user is training their gaze on a real-world object (e.g., towards an active display screen, out of a window), a holographic display object, or otherwise, and thus be used to infer whether the user's attention is focused on the real world or the augmented user interface.

Eye tracking data may be input to first neural network 315 as a raw 3D vector, as an intersection of the 3D vector with displayed 3D contents, and/or as intersections with extracted surface mesh. The eye tracking data may be considered in isolation or in combination with other inputs, such as the hand pose, head pose, etc. Eye tracking data may be considered in concert with 3D position data for display content. A user may be considered more likely to intend to interact with a hologram or other display object if the eye tracking data indicates the hologram is in the user's field of view. The user may be considered unlikely to intend to interact with such holograms if the gaze vectors indicate that the user is looking away. Direct gaze data may be augmented by data indicating how recently the user has been looking at or otherwise paying attention to such a hologram, the user's history of interactions with the hologram, etc. For example, if a user has recently typing on a virtual keyboard, it may be considered more likely that a next gesture that resembles hitting a virtual key is intended as such, as opposed to a user that has not been typing for an threshold duration.

In some examples, raw data from sensor suite 305 may be provided as an input to first neural network 315 in addition to or as an alternative to pre-processed data. Other inputs to first neural network 315 may include user interface data 320, such as the properties and location of display objects presented on the HMD, and may further include secondary device inputs 325 associated with the user, such as mobile phones, tablet computers, game controllers, personal computers and other computing and/or input devices that may be communicatively coupled with the HMD.

In particular, secondary devices that are configured to communicate with the HMD may provide real-time or near real-time data that indicates the user's hand position, applications the user may be interacting with, etc. For example, the secondary device may indicate a duration since the user has last interacted with a secondary device UI, whether the screen is active, whether the content management system is registering inputs, etc. If the secondary device includes accelerometers, gyroscopes, etc., more direct data regarding the user's hand pose, activity, etc. may be conveyed.

For gaming and other application driven scenarios, it may be indicated whether the associated secondary device (e.g., game controller) is on, whether the controller is being held, whether an input button has been pressed and how recently. In some examples, the application state may indicate whether the user is more likely to intend to interact with a UI via gesture input and in what fashion. For example, if the action of a game over a certain time frame would normally require the user to have both hands engaged with the controller, it may be strongly inferred that the user will not be performing gesture inputs. In other aspects of game play, if the user is instructed to perform gesture inputs for a specific result in a predetermined window, a strong assumption may be made that the user is likely to be performing gesture inputs. In scenarios wherein the user is engaged with a specific application on a secondary device that does not use or require gesture inputs, a low intent to interact via gesture input may be inferred. However, if the user is engaged with an application that allows for gesture input in some scenarios (e.g., a user initiates media playback on an external speaker and is enabled to adjust volume, etc. via gesture inputs), an increased likelihood of interaction via gesture input may be inferred. Such an inference may be determined via training the neural network in a supervised manner with ground truths that a certain set of gesture interactions are more likely based on a certain set of input data frames, and/or training the neural network in an unsupervised manner with the actual labeled gesture that followed the set of input data frames.

First neural network 315 may be a deep neural network, such as a recurrent neural network, a deep network architecture such as a Transformers neural network, any suitable machine learning model that operates on sample data, and/or any other regression or classification techniques that use recurring role aspects that are suited to sequence recognition.

First neural network 315 may be trained to recognize features indicative of a plurality of subsequent gesture interactions corresponding to whether a set of data for an input frame is more or less likely to perform gesture input in the near future. Multiple input types may be fused over a sequence of two or more frames to capture temporal information, as described further herein and with regard to FIG. 8. First neural network 315 may be trained on input data gathered while a training subject is interacting with display content or not interacting with display content. The input data may be labeled according to user activity, both at the present and in the future. Training data may further include inputs associated with the user using a phone, gesticulating, typing on computer, using mouse, pushing a real button, etc. In general, the gesture input herein will be described with regard to pure gesture inputs, but may additionally or alternatively include gesture interactions with holograms and/or other display images. First neural network 315 may be trained to indicate whether or not the user intends to make any of a plurality of subsequent gesture interactions, but by way of analysis may indicate that the user is more likely to make certain types of gesture interactions than others. For example, a user looking away from a portion of the display may be unlikely to interact with content displayed on that portion. A user holding a real-world object in one hand may not be able to perform certain types of gesture input, but may be able to make simple gestures like pressing a hologram.

In addition to machine learning evaluation of raw and pre-processed sensor data, heuristics 330 may be used to analyze data frames and determine tangible data about the user and their environment. The outputs of heuristics 330 may be provided to first neural network 315 and/or second neural network 340. As one example, heuristics 330 may evaluate hand tracking data and an extracted surface mesh for an environment and determine a distance between a hand and a nearest surface. One or more rays may be cast from the hand (e.g., a ray cast plumb downward from the hand) and distances from nearest surfaces may be determined. Whether the hand is within a threshold distance from a surface may be used as an input to first neural network 315, as a user may be less likely to perform a gesture input if their hand is close to another surface such as a table or a wall.

First neural network 315 may in some examples be trained to evaluate whether the user is holding an object in their hand, and thus less likely to perform a gesture input. As an example, object classifiers may be used, akin to the hand tracking system, which may generate binary outputs (e.g., hand is holding an object or is empty). Additionally or alternatively, object classifiers may be used to detect frequent use objects within a threshold proximity to the user's hand joints, such as a coffee cup or piece of fruit. In particular, if such an object were located between a user's thumb and forefinger, certain types of gesture input such as an air tap would be difficult to perform.

Figure 5:
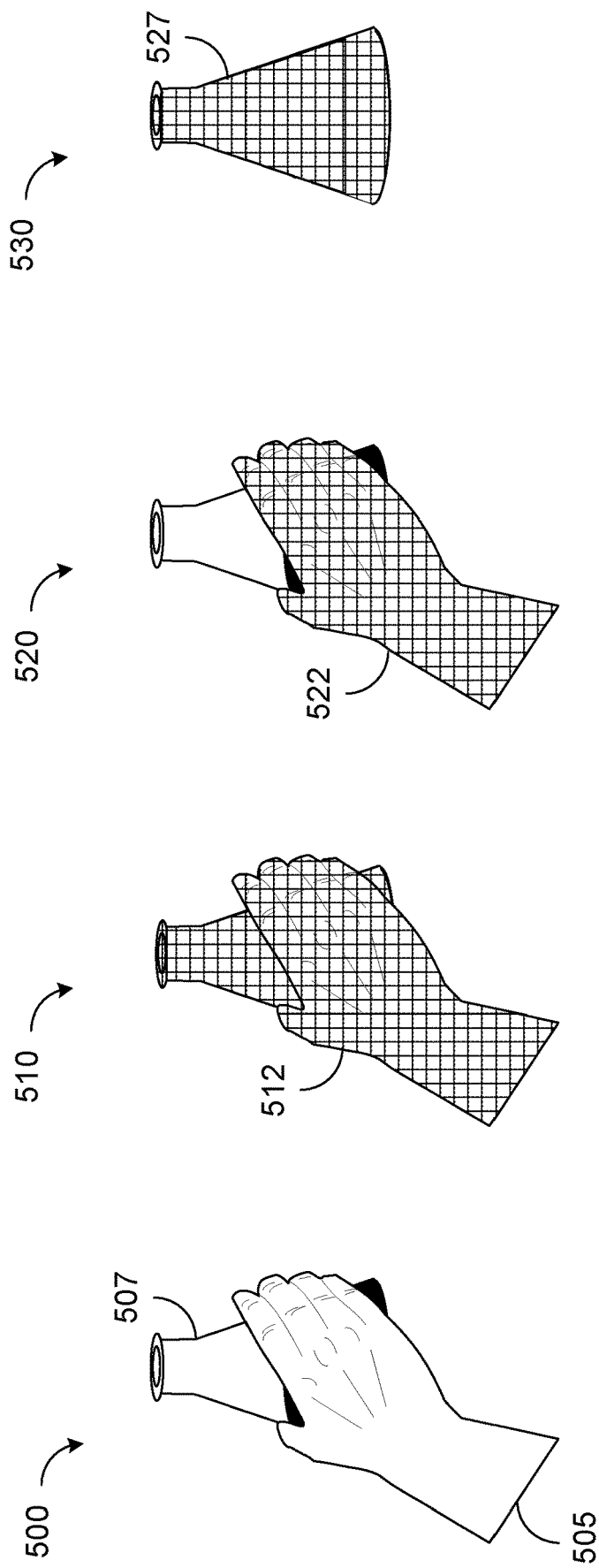
FIG. 5 illustrates a heuristic method for determining whether a user is holding an object.

Additionally or alternatively, heuristics 330 may provide means other than machine learning approaches to determine whether a user is holding an object in one or both hands. As an example, FIG. 5 illustrates a heuristic method for determining whether a user is holding an object. At 500, a user's hand 505 is shown holding a beaker 507. At 510, a surface mesh for a region of interest 512 including hand 505 and any associated objects, such as beaker 507, is extracted from a depth image (e.g., point cloud) of the environment. At 520, a surface mesh 522 for hand 505 generated by the hand tracking system is shown. Surface mesh 522 may then be subtracted out from surface mesh 512, yielding a surface mesh 527 for only beaker 507, as shown at 530. If the total number of voxels remaining in the surface mesh following the subtraction is above a threshold, it may be inferred that the hand is holding an object. Additionally or alternatively regardless of the methodology, a binary determination as to whether or not there exists an object in the hand may be provided as an input to first neural network 515 and/or second neural network 340.

Heuristic 330 may further be used to evaluate raw and/or pre-processed inputs using rule classifications. For example, heuristics 330 may be configured to evaluate the conformation of a user's hand, absolute and/or relative motion of one or more hand joints. Movements and velocities of various hand joints may be tracked over one or more data frames, and thus applied to the current and/or future frames of gesture recognition.

Figure 6:
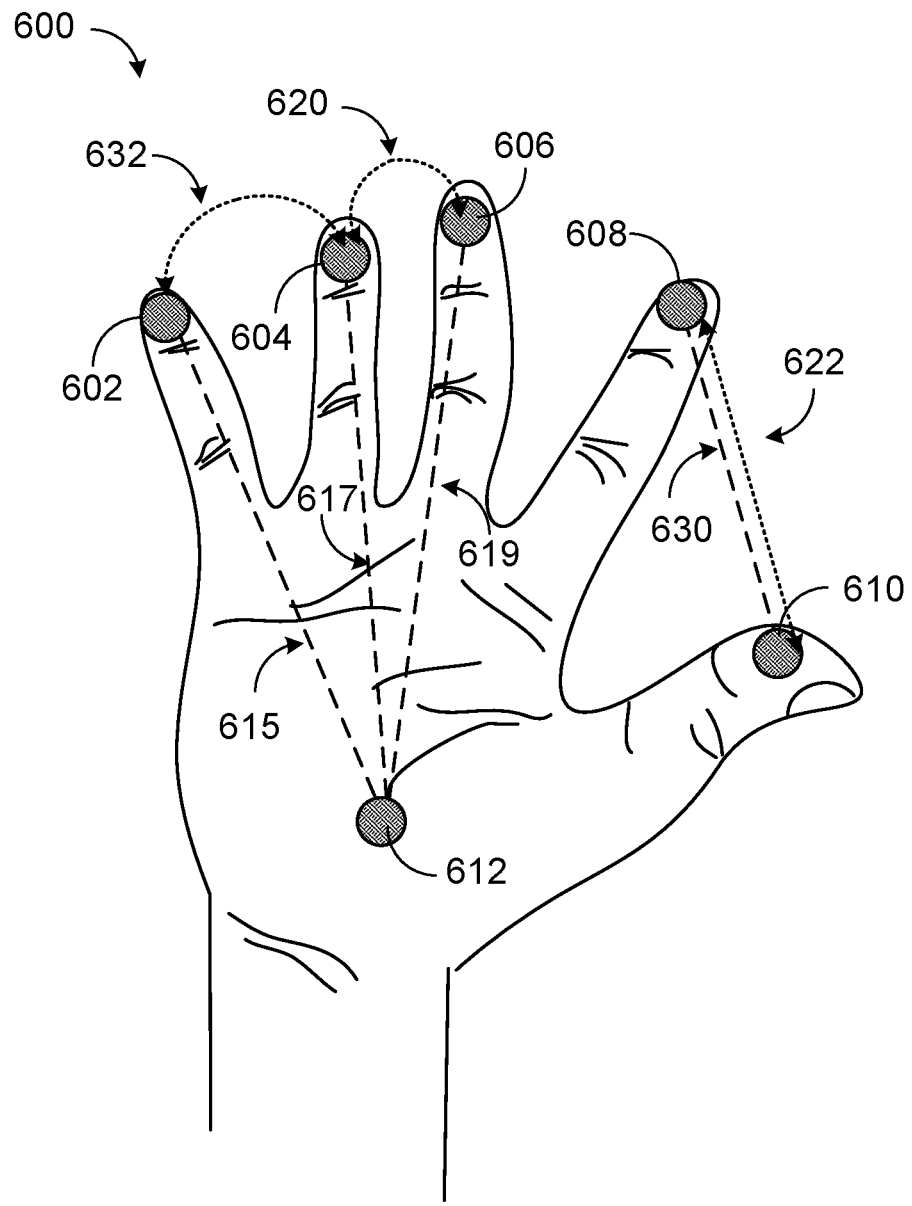
FIG. 6 shows example heuristic parameters for a user performing a gesture.

FIG. 6 shows a right hand of a user 600 with a set of feature points labeled—pinky finger tip 602, ring finger tip 604, middle finger tip 606, index finger tip 608, thumb tip 610, and palm 612. The velocity of each feature point moving in space may be registered. Distances between palm 612 and each of pinky finger tip 602, ring finger tip 604, middle finger tip 606, as indicated at 615, 617, and 619, may be used to determine whether the user's hand is curled.

The distance 620 between thumb tip 610 and index finger tip 608 may be used to determine when a pinch select gesture may be triggered or likely to occur. Further, the velocity 622 between thumb tip 610 and index finger tip 608 may be used to compensate for lag in motions above a threshold velocity.

A speed difference 630 between ring finger tip 604 and middle finger tip 606 may be used to determine if the user is typing, playing piano, etc. Similarly, a speed difference 632 between ring finger tip 604 and pinky finger tip 602 may be used to discern activities such as typing, and/or to indicate unstable tracking.

Figure 7:
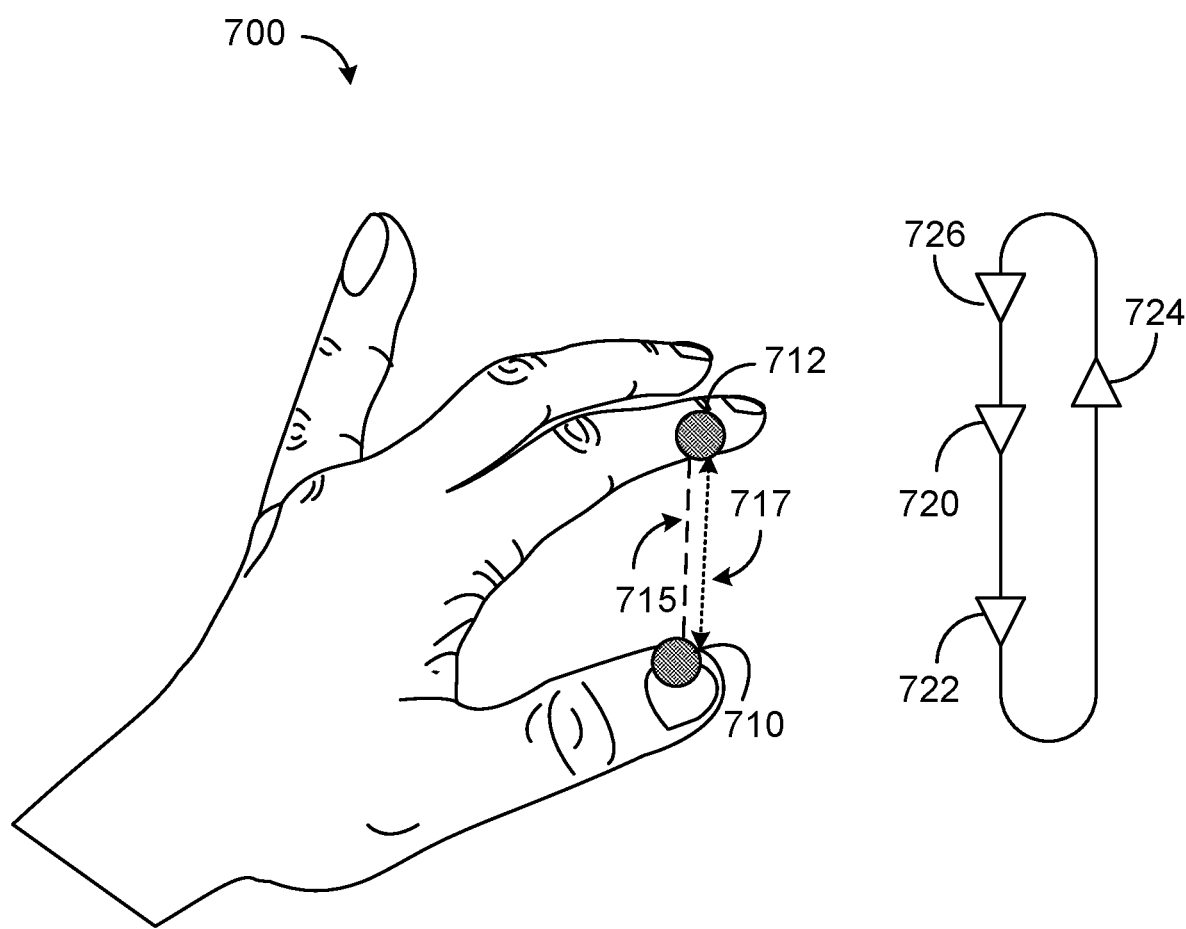
FIG. 7 shows example heuristic parameters for a user's hand in motion.

FIG. 7 shows a left hand 700 of a user performing a pinch select gesture. A thumb tip 710 and an index finger tip 712 may be tracked, with relative distances (715) and velocities (717) extracted. A series of gates may be established for the fingers. Including a first gate 720, a second gate 722, a third gate 724, and a hover gate 726. In this example, the first gate 720 represents a position where thumb tip 710 and index finger tip 712 are moving together at a first distance, and the second gate 722 represents a position where thumb tip 710 and index finger tip 712 are moving together at a second distance, less than the first distance. Third gate 724 represents a position where thumb tip 710 and index finger tip 712 are moving apart, and hover gate 726 represents a position where thumb tip 710 and index finger tip 712 are held at a third distance, greater than the first distance.

If first gate 720 is triggered, a timer to reach second gate 722 may be triggered. If second gate 722 is triggered, a pinch select event may be initiated. If third gate 724 is triggered, the pinch select event is stopped. If the hover gate is triggered, a display affordance may be provided to the user, such as a circle at the user's gaze point. A curled hand, as described with regard to FIG. 6 may be used to adapt the gating values, such as a subtracted offset, which may lower the stringency for triggering a pinch select event. If the palm of the user is moving above a threshold velocity the pinch select gesture recognition criteria may be disabled. Velocity of one or more hand joints may be used to smooth the heuristic calculations and/or to counteract tracking lag.

Likelihood of gesture interaction 335 may be provided to second neural network 340 with a class label, such as ready to interact/high likelihood, ambiguous intent, not ready to interact/low likelihood, or currently interacting and/or with a real numerical label, such as a number from 0 to 1 expressing a continuum of likelihoods. Likelihood of gesture interactions 335 may be provided to a plurality of gesture-specific neural networks within second neural network 340, or to a single neural network trained to recognize a plurality of different gestures. If a user is indicated to be not ready to interact, second neural network 340 may effectively ignore relevant input signals, thereby reducing false positives. Conversely, if a user is indicated to be ready to interact with holographic content, it may indicate that the user is within approximately one second from initiating a gesture interaction. Second neural network 340 may thus relax gesture recognition parameters 345 to increase sensitivity, as false positives are less likely to occur. In this way, second neural network 340 can have increased sensitivity, e.g., more permissive, in order to allow for recognition of more subtle gestures, such as more socially acceptable gestures. The resulting technical effect is a reduced burden of user input to a computing device.

As shown in FIG. 3, first neural network 315 may provide the determined likelihood of gesture interaction 335 to UI control 355 as well as to second neural network 340, noting that first neural network 315 and second neural network 340 may be separate or overlapping facets of the same neural network. This may allow for UI control 355 to adapt display content in advance of an expected gesture input, or with an assumption that the user will not be providing input. UI control 355 may thus augment or diminish display content such as affordances. For example, UI control 355, given an above threshold likelihood of gesture interaction, may increase the size or visibility of an affordance, adjust the appearance of an affordance to present multiple options to the user, etc. In some examples, where the likelihood of interaction is indicated for future gesture interactions, specific input criteria may be activated or de-constrained in preparation for such an interaction.

First neural network 315 may output a likelihood of interaction for a predetermined window of frames based on an analysis of a sequence of recent and/or current data frames. The predetermined window of frames may include a current data frame and/or subsequent or future frames. By analyzing multiple sequential frames, first neural network 315 may generate more accurate predictions than can be made using a single frame.

Figure 8:
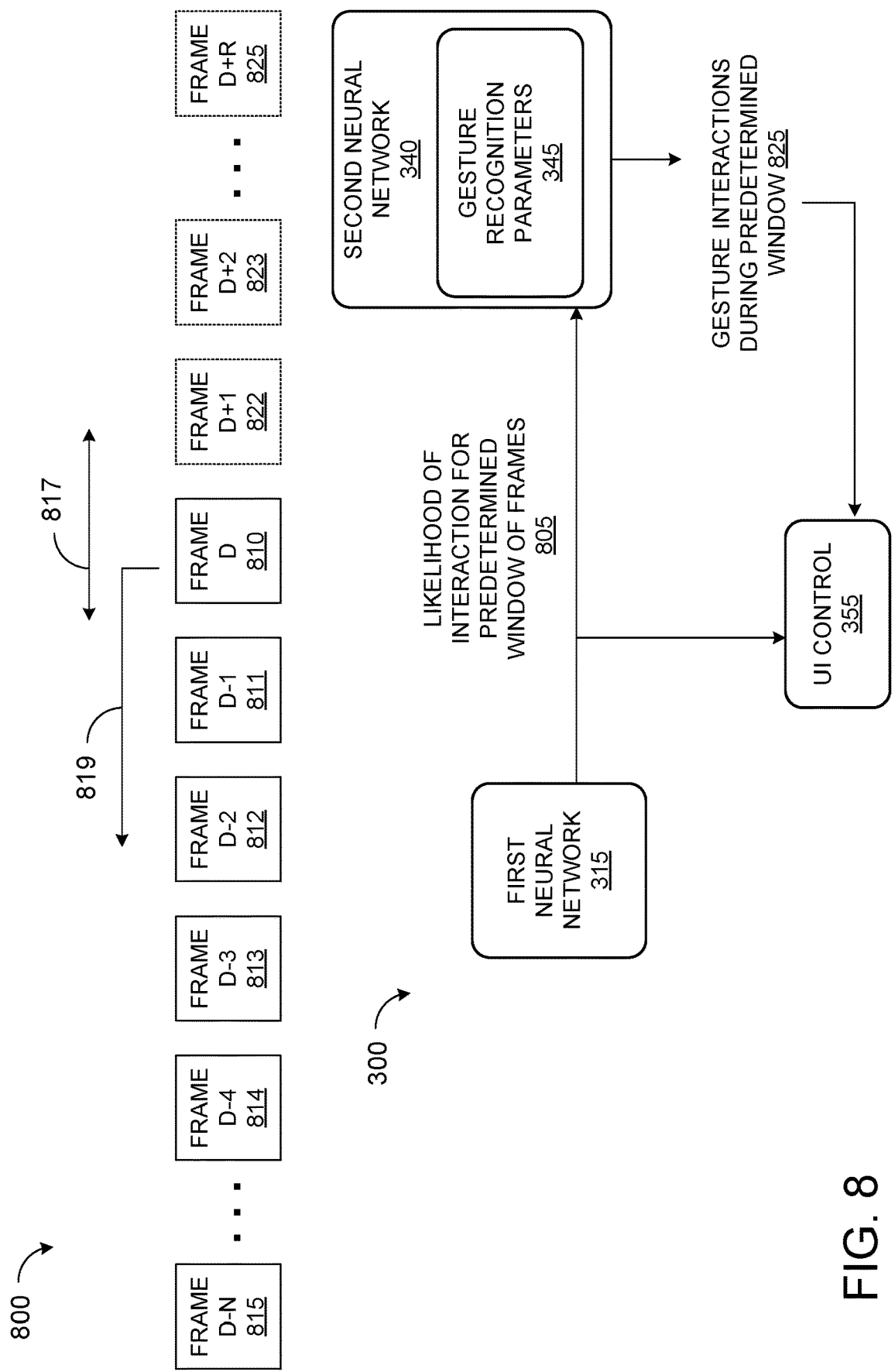
FIG. 8 schematically shows a system for evaluating sequential frames of input data for a likelihood of user interaction.

FIG. 8 shows an example system 800 for evaluating a sequence of two or more data frames using aspects of system 300. First neural network 315 may be trained via N-way classification using features such as sequences of hand joint poses over multiple data frames. As a non-limiting example, 16 consecutive frames of data may be used in determining a likelihood of interaction for a predetermined window of frames 805, though more or fewer data frames may be used, e.g., based on the speed of the performance of gesture interactions. Each data frame may include raw date from sensor suite 305, pre-processed data from data pre-processing machines 310, UI data 320, secondary device inputs 325, heuristics 330, etc. Each input to a data frame may be temporally aligned to the degree possible.

As shown frame D 810 may be considered a current data frame. A previous window of sequential frames may include including frame D-1 811, frame D-2 812, frame D-3 813, frame D-4 814, etc., through frame D-N 815 (e.g., where N=16). In some examples, the predetermined window of frames 817 comprises current frame D 810. As such, sequence of two or more data frames 819 may be received and/or analyzed by first neural network 315 prior to current data frame D 810. In other words, predetermined window 817 includes at least a data frame received subsequent to the sequence of two or more data frames 819 evaluated by first neural network 315 to determine the likelihood of interaction for predetermined window of frames 805. Likelihood of interaction for predetermined window of frames 805 may be provided to second neural network 340 in order to adjust gesture recognition parameters 345 for analyzing frame D 810. Based on this analysis, second neural network 340 may output a determination for gesture interactions during the predetermined window 820, which may be provided to UI control 355.

The use of multiple sequential frames may allow for anticipation or early recognition of some gesture interactions. First neural network 315 may generate predictions based on each frame individually, and/or based on changes in input data across multiple frames. Additionally, the sequential frames may be used to smooth predictions, for example, selecting a most frequent prediction over a window of frames and/or tossing out predictions that do not align with those frames before and after. In some examples, frames with higher confidence scores may be weighed more heavily than frames with lower confidence scores in generating a likelihood of interaction for predetermined window of frames 805.

In examples where only current frame D 810 is analyzed by second neural network 340, the predetermined window may shift or each subsequent frame. For example, for frame D+1 820, frame D-N 815 is dropped from analysis and frame D 810 is added.

In addition to or as an alternative to generating likelihoods of interaction for a current frame, first neural network 315 may be configured to generate likelihoods of interaction for one or more future frames (e.g., frame D+1 822, frame D+2 823, frame D+R 825). For example, first neural network could provide indications of all possible user actions over the next ten frames, or within a given temporal radius. As such, the output of first neural network 315 may be include a sequence of predictions as each new frame of data is acquired. For multi-sequence and/or multi-frame gestures, the sequence of two or more data frames 819 may overlap with the predetermined window 817. As such, in some examples, current frame D 810 may be provided to both first neural network 315 and second neural network 340.

Figure 9:
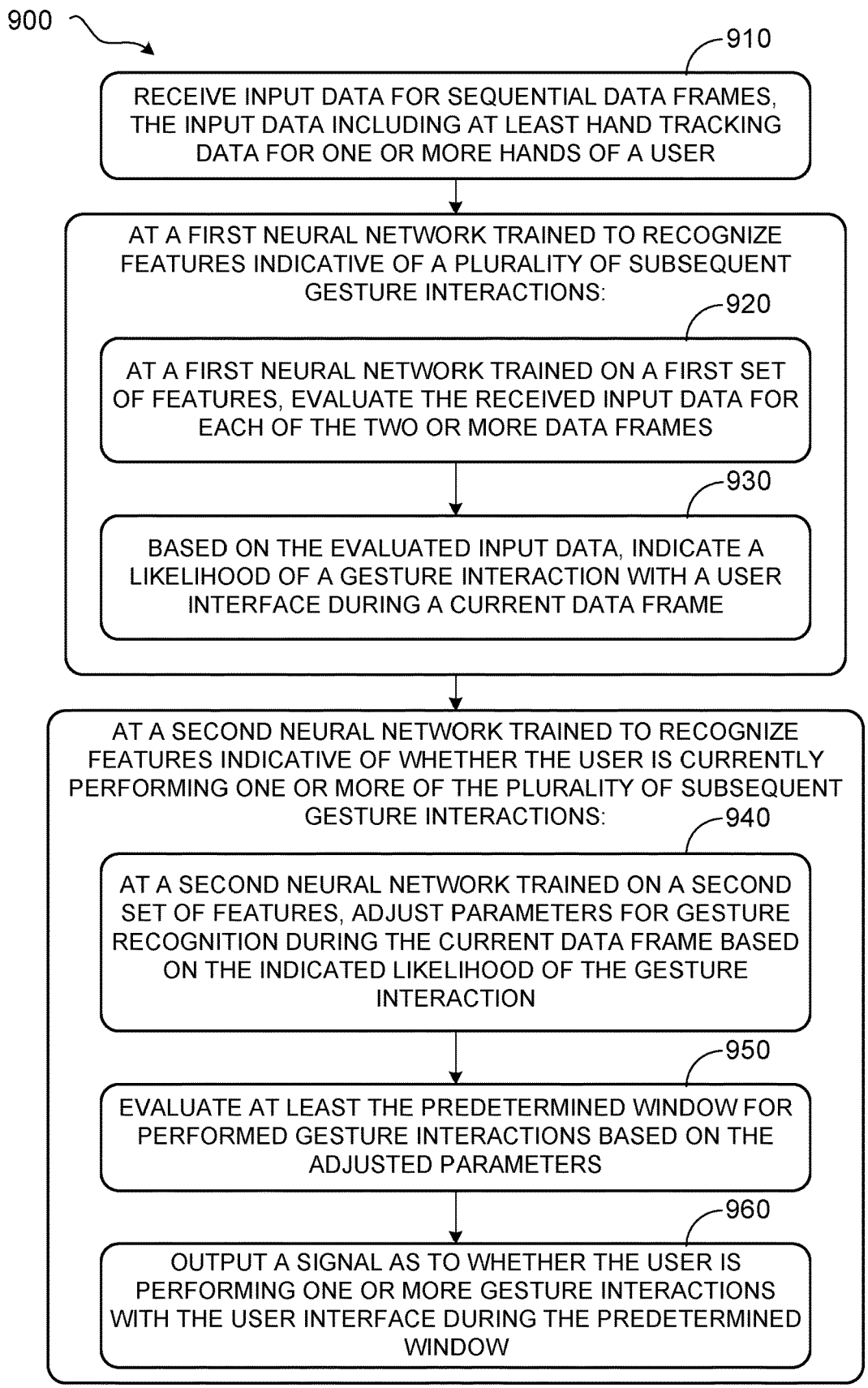
FIG. 9 shows an example method for gesture input.

FIG. 9 shows an example method 900 for gesture input, in accordance with the present disclosure. Method 900 may be executed by one or more computing devices, such as a head mounted display. System 300 may be such an example computing device.

At 910 method 900 includes receiving input data for sequential data frames, the input data including at least hand tracking data for one or more hands of a user. For example, the input data may include data generated by sensors of a head-mounted display worn by the user. The input data may further include eye tracking data for the user, body-pose data for the user, and/or EMG data for the user. The input data may further include display data regarding positioning of display objects of the user interface presented on the head-mounted display. The input data may further include data received from a secondary device, such as a phone, tablet, laptop, game controller, etc. associated with the user. The input data may further include a surface mesh for an environment generated based on data received from one or more depth cameras.

Method 900 may be executed by a computing device that includes a first neural network trained to recognize features indicative of a plurality of subsequent gesture interactions a second neural network trained to recognize features indicative of whether the user is currently performing one or more of the plurality of subsequent gesture interactions.

At 920, method 900 includes, at the first neural network, evaluating input data for a sequence of two or more data frames. The received input data may be analyzed on a frame-by-frame basis, and/or sequences of data frames may be analyzed in tandem. By using multiple frames over time, the predictions for each frame may be smoothed in order to reduce noisy classifications. For example, an indication may need to be stable for several frames in order to be considered valid. Further, this enables capturing actions and movements that occur as the user prepares to make a gesture input, such a hand pausing briefly before making a click gesture. Further, jittery joint tracking may indicate inaccurate or error prone hand tracking.

At 930, method 900 includes, outputting an indication of a likelihood of the user performing one or more subsequent gesture interactions with a user interface during a predetermined window of one or more data frames. Such a likelihood may indicate whether the user is in a state or approaching a state where they are attempting to make a gesture indication or whether they are even in a state where they are capable of making a gesture indication. In some examples, the likelihood of the user performing one or more subsequent gesture interactions is further based on a likelihood that the user is manually interacting with a real-world object. The likelihood of the user performing one or more subsequent gesture interactions may be further based on a distance between a hand of the user and a nearest real-world surface. The likelihood of user performing one or more subsequent gesture interactions may be further based on an indicator of hand tracking precision. The likelihood of user performing one or more subsequent gesture interactions may still further be based on an indication that the user is performing one or more repeatable pre-gesture behaviors.

At 940, method 900 includes, at the second neural network trained on a second set of features, adjusting parameters for gesture interaction recognition during the predetermined window based on the indicated likelihood of the user performing one or more of the plurality of subsequent gesture interactions. As described herein and with regard to FIG. 3, the first and second neural networks may be implemented as a single neural network or other trained model that uses sequences of previously received data frames to predict user intentions, and to subsequently use the predicted user intentions to more accurately recognize a broader range of gestures using adjusted recognition parameters. Adjusting parameters may include decreasing a stringency of the parameters for gesture recognition based on a likelihood of gesture interaction being above a likelihood threshold. Adjusting parameters may additionally or alternatively include increasing a stringency of the parameters for gesture recognition based on a likelihood of gesture interaction being below a likelihood threshold. In some examples, adjusting parameters may include disabling gesture recognition at the second neural network based on a likelihood of gesture interaction being below a likelihood threshold. Parameters for gesture recognition during the current data frame may be adjusted based on an indication that the user is currently engaged in gesture interaction. For example, a user currently interacting may be more likely to make certain follow up gestures, and less likely to make other, unrelated gestures. Parameters for gesture interaction recognition during the predetermined window may be adjusted based on the indicated likelihood of the user performing the gesture interaction being above a threshold certainty of the user being engaged in the gesture interaction during the sequence of two or more data frames. Adjusting parameters for gesture recognition during the predetermined window may be further based on one or more heuristic evaluations of input data for the current data frame.

At 950, method 900 includes evaluating at least the predetermined window for performed gesture interactions based on the adjusted parameters. Multiple potential gestures may be evaluated simultaneously, including gestures that provide input without regard to display content, as well as gestures that interact with display content such as holograms. At 960, method 900 includes outputting a signal as to whether the user is performing one or more gesture interactions with the user interface during the predetermined window. For example, the signal may be provided to a UI control which may perform one or more actions related to the performed gesture interactions. The technical effect of implementing such a method is improved human-computer interaction.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
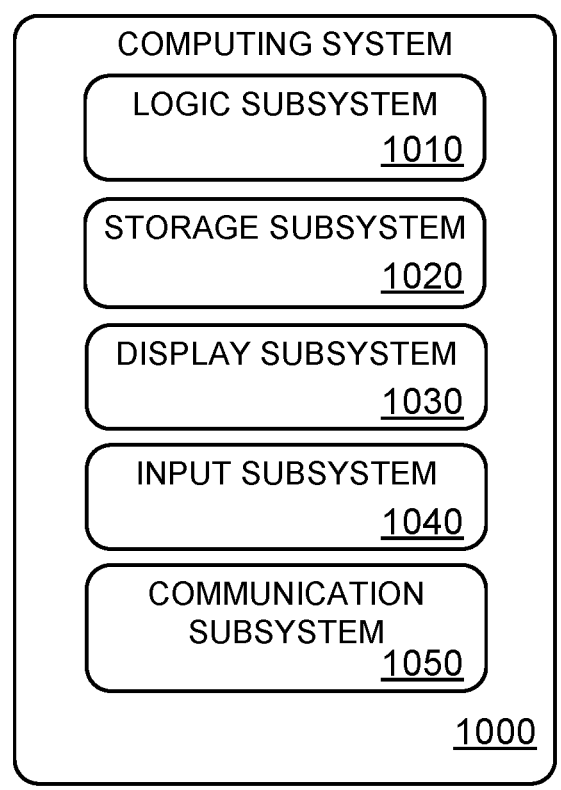
FIG. 10 shows a schematic view of an example computing device.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. HMDs 105 and 200, and system 300 may be examples of computing system 1000.

Computing system 1000 includes a logic machine 1010 and a storage machine 1020. Computing system 1000 may optionally include a display subsystem 1030, input subsystem 1040, communication subsystem 1050, and/or other components not shown in FIG. 10.

Logic machine 1010 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1020 includes one or more physical devices configured to hold instructions executable by the logic machine to implement the methods and processes described herein. When such methods and processes are implemented, the state of storage machine 1020 may be transformed—e.g., to hold different data.

Storage machine 1020 may include removable and/or built-in devices. Storage machine 1020 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1020 may include volatile, nonvolatile, dynamic, static, read/write, read-only, random-access, sequential-access, location-addressable, file-addressable, and/or content-addressable devices.

It will be appreciated that storage machine 1020 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1010 and storage machine 1020 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1010 executing instructions held by storage machine 1020. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1030 may be used to present a visual representation of data held by storage machine 1020. This visual representation may take the form of a graphical user interface (GUI). As the herein described methods and processes change the data held by the storage machine, and thus transform the state of the storage machine, the state of display subsystem 1030 may likewise be transformed to visually represent changes in the underlying data. Display subsystem 1030 may include one or more display devices utilizing virtually any type of technology. Such display devices may be combined with logic machine 1010 and/or storage machine 1020 in a shared enclosure, or such display devices may be peripheral display devices. Displays 204R and 204L may be examples of display subsystem 1030.

When included, input subsystem 1040 may comprise or interface with one or more user-input devices such as a keyboard, mouse, touch screen, or game controller. In some embodiments, the input subsystem may comprise or interface with selected NUI componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1050 may be configured to communicatively couple computing system 1000 with one or more other computing devices. Communication subsystem 1050 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In one example, a method for evaluating gesture input comprises receiving input data for sequential data frames, the input data including at least hand tracking data for one or more hands of a user; at a first neural network trained to recognize features indicative of a plurality of subsequent gesture interactions: evaluating input data for a sequence of two or more data frames; and outputting an indication of a likelihood of the user performing one or more subsequent gesture interactions with a user interface during a predetermined window of one or more data frames; at a second neural network trained to recognize features indicative of whether the user is currently performing one or more of the plurality of subsequent gesture interactions: adjusting parameters for gesture interaction recognition during the predetermined window based on the indicated likelihood of the user performing one or more of the plurality of subsequent gesture interactions; evaluating at least the predetermined window for performed gesture interactions based on the adjusted parameters; and outputting a signal as to whether the user is performing one or more gesture interactions with the user interface during the predetermined window. In such an example, or any other example the input data additionally or alternatively includes data generated by sensors of a head-mounted display worn by the user. In any of the preceding examples, or any other example, the input data additionally or alternatively further includes eye tracking data for the user. In any of the preceding examples, or any other example the input data additionally or alternatively includes body-pose data for the user. In any of the preceding examples, or any other example, the input data additionally or alternatively includes display data regarding positioning of display objects of the user interface presented on the head-mounted display. In any of the preceding examples, or any other example, adjusting parameters additionally or alternatively includes decreasing a stringency of the parameters for gesture interaction recognition based on a likelihood of gesture interaction being above a likelihood threshold. In any of the preceding examples, or any other example, adjusting parameters additionally or alternatively includes increasing a stringency of the parameters for gesture interaction recognition based on a likelihood of gesture interaction being below a likelihood threshold. In any of the preceding examples, or any other example, adjusting parameters additionally or alternatively includes disabling gesture interaction recognition at the second neural network based on a likelihood of gesture interaction being below a likelihood threshold. In any of the preceding examples, or any other example, parameters for gesture interaction recognition during the predetermined window are additionally or alternatively adjusted based on the indicated likelihood of the user performing the gesture interaction being above a threshold certainty of the user being engaged in the gesture interaction during the sequence of two or more data frames. In any of the preceding examples, or any other example, the first neural network is additionally or alternatively trained to consider whether the user is manually interacting with a real-world object. In any of the preceding examples, or any other example, the first neural network is additionally or alternatively trained to consider whether a hand of the user is within a threshold distance of a nearest real-world surface. In any of the preceding examples, or any other example, the first neural network is additionally or alternatively trained to consider one or more indicators of hand tracking precision. In any of the preceding examples, or any other example, the first neural network is additionally or alternatively trained to consider whether the user is performing one or more repeatable pre-gesture behaviors. In any of the preceding examples, or any other example, the method additionally or alternatively comprises adjusting parameters for gesture recognition during the predetermined window based on one or more heuristic evaluations of input data for the predetermined window. In any of the preceding examples, or any other example, the predetermined window additionally or alternatively includes a current data frame. In any of the preceding examples, or any other example, the predetermined window additionally or alternatively includes one or more future data frames. The technical effect of implementing this method is improved human-computer interaction.

In another example, a system for a head-mounted display comprises a display device configured to present a user interface to a user wearing the head-mounted display; a sensor suite including at least one or more outward-facing image sensors; one or more data pre-processing machines configured to receive data output from the sensor suite and to sequentially output data frames; a first neural network trained to recognize features indicative of a plurality of subsequent gesture interactions, the first neural network configured to: evaluate input data for a sequence of two or more data frames received from the one or more data pre-processing machines; and output an indication of a likelihood of the user performing one or more subsequent gesture interactions with a user interface during a predetermined window of one or more data frames; and a second neural network trained to recognize features indicative of whether the user is currently performing one or more of the plurality of subsequent gesture interactions, the second neural network configured to: adjust parameters for gesture interaction recognition during the predetermined window based on the indicated likelihood of the user performing one or more of the plurality of subsequent gesture interactions; evaluate at least the predetermined window for performed gesture interactions based on the adjusted parameters; and output a signal as to whether the user is performing one or more gesture interactions with the user interface during the predetermined window. In such an example, or any other example the system additionally or alternatively comprises one or more inward facing cameras, and wherein the input data further includes eye tracking data for the user. In any of the preceding examples, or any other example the input data additionally or alternatively includes user interface data regarding positioning of display objects on the user interface presented on the display device. The technical effect of implementing this system is improved human-computer interactions.

In yet another example, a method for evaluating gesture input comprises receiving input data for sequential data frames, the input data including at least hand tracking data for one or more hands of a user; based on an evaluation of the input data for a sequence of two or more data frames, outputting an indication of a likelihood of the user performing one or more subsequent gesture interactions with a user interface during a predetermined window of one or more data frames; and at a neural network trained to recognize features indicative of whether the user is currently performing one or more of the plurality of subsequent gesture interactions: adjusting parameters for gesture interaction recognition during the predetermined window based on the indicated likelihood of the user performing one or more of the plurality of subsequent gesture interactions, wherein adjusting parameters includes at least decreasing a stringency of the parameters for gesture interaction recognition based on a likelihood of gesture interaction being above a likelihood threshold and increasing a stringency of the parameters for gesture interaction recognition based on a likelihood of gesture interaction being below the likelihood threshold; evaluating at least the predetermined window for performed gesture interactions based on the adjusted parameters; and outputting a signal as to whether the user is performing one or more gesture interactions with the user interface during the predetermined window. The technical effect of implementing this method is decreased energy consumption from erroneous computations performed in response to unintentional interactions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for evaluating gesture input, comprising:
receiving input data for sequential data frames, the input data including at least hand tracking data for one or more hands of a user;
at a first neural network trained to recognize features indicative of a plurality of subsequent gesture interactions:
evaluating input data for a sequence of two or more data frames; and
outputting an indication of a likelihood of the user performing one or more subsequent gesture interactions with a user interface during a predetermined window of one or more data frames; and
at a second neural network trained to recognize features indicative of whether the user is currently performing one or more of the plurality of subsequent gesture interactions:
adjusting parameters for gesture interaction recognition during the predetermined window based on the indicated likelihood of the user performing one or more of the plurality of subsequent gesture interactions and based at least on one or more heuristic evaluations of the received input data for the predetermined window;
evaluating at least the predetermined window for performed gesture interactions based on the adjusted parameters; and
outputting a signal as to whether the user is performing one or more gesture interactions with the user interface during the predetermined window.

2. The method of claim 1, further comprising:
adjusting parameters of the first neural network based on one or more heuristic evaluations of the received input data.

3. The method of claim 1, wherein the heuristic evaluations include heuristic evaluations of hand tracking data for one or more hands of the user and an extracted surface mesh for an environment to determine a distance between a hand of the user and a nearest surface.

4. The method of claim 3, wherein the heuristic evaluations further include an indication as to whether the hand of the user is within a threshold distance from the nearest surface.

5. The method of claim 1, wherein the heuristic evaluations further include a binary indication as to whether a hand of the user is holding an object.

6. The method of claim 5, wherein determining the binary indication as to whether the hand of the user is holding an object comprises:
extracting a first surface mesh for a region of interest including the hand of the user and any associated objects from a depth image of an environment;
generating a second surface mesh for the hand of the user based on the hand tracking data; and
subtracting the second surface mesh from the first surface mesh to generate an object surface mesh.

7. The method of claim 6, wherein an indication as to whether a total number of voxels of the object surface mesh is less than a threshold is provided as an input to the first neural network.

8. The method of claim 1, wherein the heuristic evaluations comprise:
evaluating hand tracking data for one or more hands of the user for two or more feature points of the hand of the user;
evaluating the velocity of each feature point in an environment;
evaluating distances between feature points in the environment; and
tracking relative velocities and distances between feature points in the environment over one or more data frames.

9. The method of claim 8, wherein the heuristic evaluations comprise evaluating a likelihood of the hand of the user being in a conformation to provide gesture input.

10. The method of claim 8, wherein the heuristic evaluations comprise evaluating a likelihood that the hand of the user is engaged in an activity.

11. A system for a head-mounted display, comprising:
a display device configured to present a user interface to a user wearing the head-mounted display;
a sensor suite including at least one or more outward-facing image sensors;
one or more data pre-processing machines configured to:
receive data output from the sensor suite and to sequentially output data frames;
a first neural network trained to:
receive input data for sequential data frames, the input data including at least hand tracking data for one or more hands of a user; and
evaluate input data for a sequence of two or more data frames; and
output an indication of a likelihood of the user performing one or more subsequent gesture interactions with a user interface during a predetermined window of one or more data frames; and
a second neural network trained to:
recognize features indicative of whether the user is currently performing one or more of the plurality of subsequent gesture interactions;
adjust parameters for gesture interaction recognition during the predetermined window based on the indicated likelihood of the user performing one or more of the plurality of subsequent gesture interactions and based at least on one or more heuristic evaluations of the received input data for the predetermined window;
evaluate at least the predetermined window for performed gesture interactions based on the adjusted parameters; and
output a signal as to whether the user is performing one or more gesture interactions with the user interface during the predetermined window.

12. The system for a head-mounted display of claim 11, wherein the parameters of the first neural network are adjusted based on one or more heuristic evaluations of the received input data.

13. The system for a head-mounted display of claim 11, wherein the heuristic evaluations include heuristic evaluations of hand tracking data for one or more hands of the user and an extracted surface mesh for an environment to determine a distance between a hand of the user and a nearest surface.

14. The system for a head-mounted display of claim 11, wherein the heuristic evaluations further include a binary indication as to whether a hand of the user is holding an object.

15. The system for a head-mounted display of claim 11, wherein the heuristic evaluations comprise:
   evaluating hand tracking data for one or more hands of the user for two or more feature points of the hand of the user;
   evaluating the velocity of each feature point in an environment;
   evaluating distances between feature points in the environment; and
   tracking relative velocities and distances between feature points in the environment over one or more data frames.

16. A computer-readable storage machine comprising computer-executable instructions that, when executed, cause one or more logic subsystems of a computing device to:
   receive input data for sequential data frames, the input data including at least hand tracking data for one or more hands of a user;
   at a first neural network trained to recognize features indicative of a plurality of subsequent gesture interactions:
      evaluate input data for a sequence of two or more data frames; and
      output an indication of a likelihood of the user performing one or more subsequent gesture interactions with a user interface during a predetermined window of one or more data frames; and
   at a second neural network trained to recognize features indicative of whether the user is currently performing one or more of the plurality of subsequent gesture interactions:
      adjust parameters for gesture interaction recognition during the predetermined window based on the indicated likelihood of the user performing one or more of the plurality of subsequent gesture interactions and based at least on one or more heuristic evaluations of the received input data for the predetermined window;
      evaluate at least the predetermined window for performed gesture interactions based on the adjusted parameters; and
      output a signal as to whether the user is performing one or more gesture interactions with the user interface during the predetermined window.

17. The computer-readable storage machine of claim 16, where the instructions are further executable to adjust the parameters of the first neural network based on one or more heuristic evaluations of the received input data.

18. The computer-readable storage machine of claim 16, where the instructions are further executable to perform heuristic evaluations of hand tracking data for one or more hands of the user and an extracted surface mesh for an environment to determine a distance between a hand of the user and a nearest surface.

19. The computer-readable storage machine of claim 16, where the instructions are further executable to perform heuristic evaluations that further include a binary indication as to whether a hand of the user is holding an object.

20. The computer-readable storage machine of claim 16, where the instructions are further executable to:
   evaluate hand tracking data for one or more hands of the user for two or more feature points of the hand of the user;
   evaluate the velocity of each feature point in an environment;
   evaluate distances between feature points in the environment; and
   track relative velocities and distances between feature points in the environment over one or more data frames.

* * * * *